United States Patent
Liu

(10) Patent No.: US 12,341,666 B2
(45) Date of Patent: Jun. 24, 2025

(54) SERVICE MONITORING METHOD, APPARATUS, AND SYSTEM

(71) Applicant: Huawei Technologies Co., Ltd., Shenzhen (CN)

(72) Inventor: Min Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 17/951,744

(22) Filed: Sep. 23, 2022

(65) Prior Publication Data

US 2023/0020974 A1    Jan. 19, 2023

Related U.S. Application Data

(63) Continuation of application No. PCT/CN2020/141354, filed on Dec. 30, 2020.

(30) Foreign Application Priority Data

Mar. 25, 2020    (CN) .......................... 202010218866.5

(51) Int. Cl.
*H04L 41/5009* (2022.01)
*H04L 41/069* (2022.01)
*H04L 41/5067* (2022.01)

(52) U.S. Cl.
CPC ........ *H04L 41/5009* (2013.01); *H04L 41/069* (2013.01); *H04L 41/5067* (2013.01)

(58) Field of Classification Search
CPC ............... H04L 41/5009; H04L 41/069; H04L 41/5067
See application file for complete search history.

(56) References Cited

U.S. PATENT DOCUMENTS

| | | | |
|---|---|---|---|
| 10,581,664 | B1 | 3/2020 | Peng et al. |
| 2014/0089993 | A1 | 3/2014 | Huysegems et al. |

(Continued)

FOREIGN PATENT DOCUMENTS

| | | |
|---|---|---|
| CN | 101483559 A | 7/2009 |
| CN | 104486156 A | 4/2015 |

(Continued)

OTHER PUBLICATIONS

Brockners et al. "Data Fields for In-situ OAM", IETF.org, Mar. 8, 2020 [retrieved on Sep. 23, 2023]. Retrieved from the Internet: <URL: https://datatracker.ietf.org/doc/pdf/draft-ietf-ippm-ioam-data-09>. (Year: 2020).*

(Continued)

*Primary Examiner* — Lesa M Kennedy
(74) *Attorney, Agent, or Firm* — Slater Matsil, LLP

(57) ABSTRACT

A method includes: receiving a current data packet of a target service; adding detection indication information to the current data packet, to obtain a target data packet, where the (Continued)

detection indication information includes a target phase category corresponding to the current data packet, the target phase category is used to indicate a target phase in at least one key phase in which the current data packet is located in the target service, and the detection indication information is used to indicate to detect the current data packet; and transmitting the target data packet to a next hop node.

20 Claims, 8 Drawing Sheets

(56) References Cited

U.S. PATENT DOCUMENTS

| | | | |
|---|---|---|---|
| 2017/0041238 A1 | 2/2017 | Do et al. | |
| 2018/0241680 A1* | 8/2018 | Larose | H04L 45/64 |
| 2018/0331933 A1* | 11/2018 | Song | H04L 12/4633 |
| 2020/0052979 A1* | 2/2020 | Clemm | H04L 41/5019 |
| 2020/0145255 A1* | 5/2020 | Pignataro | H04L 12/4633 |
| 2020/0162337 A1* | 5/2020 | Jain | H04L 41/40 |
| 2021/0281553 A1* | 9/2021 | Ward | G06F 21/53 |

FOREIGN PATENT DOCUMENTS

| | | |
|---|---|---|
| CN | 105828376 A | 8/2016 |
| CN | 106850298 A | 6/2017 |
| CN | 110730111 A | 1/2020 |
| WO | 2017116853 A1 | 7/2017 |

OTHER PUBLICATIONS

Alreshoodi, M. "Prediction of Quality of Experience for Video Streaming Using Raw QoS Parameters", University of Essex Research Repository, thesis, May 2016 [retrieved on Mar. 3, 2024]. Retrieved from the Internet: <URL: https://core.ac.uk/download/pdf/74374050.pdf> (Year: 2016).*

Brockners, F. et al., "Data Fields for In-situ OAM", IPPM, Internet Draft, Mar. 8, 2020, 43 Pages.

Browne, R. et al., "A Key Performance indicators (KPI)", Network Working Group, Internet Draft, Feb. 25, 2019, 27 Pages.

Series E: Overall Network Operation, Telephone Service, Service Operation and Human Factors, ITU-T, Telecommunication Standardization Sector of ITU, E.475, Jan. 2020, 39 Pages.

Song, H., et al, "In-situ Flow Information Telemetry", OPSAWG, Internet Draft, Mar. 9, 2020, 26 Pages.

* cited by examiner

ID, APPARATUS, AND SYSTEM

CROSS-REFERENCE TO RELATED APPLICATIONS

This application is a continuation of International Application No. PCT/CN2020/141354, filed on Dec. 30, 2020, which claims priority to Chinese Patent Application No. 202010218866.5, filed on Mar. 25, 2020. The disclosures of the aforementioned applications are hereby incorporated by reference in their entireties.

TECHNICAL FIELD

This application relates to the field of network communication technologies, and in particular, to a service monitoring method, apparatus and system.

BACKGROUND

With development of network technologies, an increasing quantity of services (for example, a cloud virtual reality (Cloud VR) live service) emerge. A carrier performs operation and maintenance on the service based on a quality of experience (QoE) indicator of a user for the service. Therefore, a direct appeal of operation monitoring by the carrier is the QoE indicator of the user for the service, instead of a network key performance indicator (KPI) of a network in which the service is located.

In a related technology, when obtaining the QoE indicator, the carrier can obtain the QoE indicator only by using an assessment of the user on the service. Then, the carrier determines an operating status of the service based on the QoE indicator.

The user can assess the service only after the user finishes using the service. Therefore, the QoE indicator obtained by the carrier may be delayed. As a result, the carrier cannot learn of the operating status of the service in time.

SUMMARY

Embodiments of this application provide a service monitoring method, apparatus, and system, to learn of an operating status of a service in time by using this application.

According to a first aspect, a service monitoring method is provided. The method includes: receiving a current data packet of a target service; adding detection indication information to the current data packet, to obtain a target data packet, where the detection indication information includes a target phase category corresponding to the current data packet, the target phase category is used to indicate a target phase in at least one key phase in which the current data packet is located in the target service, and the detection indication information is used to indicate to detect the current data packet; and transmitting the target data packet to a next hop node.

In the solution shown in this application, a data packet transmit end of the target service sends a data packet, the data packet enters a detection domain through network transmission, and a $1^{st}$ detection node in the detection domain receives the data packet (where the data packet is the current data packet). For ease of description, the $1^{st}$ detection node in the detection domain is a first detection node for short below. The first detection node may obtain a phase category (that is, the target phase category) of the current data packet. The target phase category may be used to indicate the target phase in the at least one (where "at least one" indicates one or more) key phase in which the current data packet is located in the target service. Then, the first detection node may add the detection indication information to the current data packet, to obtain the target data packet. The detection indication information includes the target phase category corresponding to the current data packet. Then, the first detection node may query a forwarding table for a destination address in the target data packet, to obtain the next hop node. Then, the first detection node sends the target data packet to the next hop node.

In this way, because an operating status of a service can be detected with every flow based on a phase category to which a data packet belongs, the operating status of the service can be learned of in time.

In a possible implementation, the method further includes: obtaining a network KPI corresponding to the target phase category; and setting, in the detection indication information, the network KPI corresponding to the target phase category, where the network KPI corresponding to the target phase category is a network KPI that corresponds to the target phase of the target service when a QoE indicator meets a target ideal condition.

The network KPI corresponding to the target phase category refers to a network KPI that is required in the key phase indicated by the target phase category and that is under the QoE indicator wanted by operation and maintenance personnel (that is, the QoE indicator meets the target ideal condition). A target value varies depending on different QoE standards. For example, the QoE standard is a scoring standard, the QoE indicator is 0 to 5, 5 represents a highest QoE indicator, 0 represents a lowest QoE indicator, and the target ideal condition is that a value of the QoE indicator is greater than or equal to 4.

In the solution shown in this application, the first detection node may obtain the network KPI corresponding to the target phase category, and then set the network KPI in the detection indication information of the current data packet. In this way, another detection node in the detection domain can obtain, from the detection indication information, the network KPI corresponding to the target phase category.

In a possible implementation, a network KPI corresponding to at least one phase category of the target service is obtained, where the at least one phase category is used to indicate the at least one key phase of the target service, the at least one phase category includes the target phase category, the network KPI corresponding to the at least one phase category is determined based on historical service data, a service type, and a key parameter of the target service, and the key parameter includes one or more of the target ideal condition of the QoE indicator, a parameter of the data packet transmit end and a parameter of a data packet receive end, or location information of a data packet receive end; the network KPI corresponding to the at least one phase category is added to the forwarding table; and the network KPI corresponding to the target phase category is determined from the forwarding table.

In the solution shown in this application, a node (for example, a statistics collection node) outside the detection domain may determine, based on the historical service data, the service type, and the key parameter of the target service, the network KPI corresponding to the at least one phase category of the target service. The key parameter includes one or more of the target ideal condition of the QoE indicator, the location information of the data packet receive end, or the parameter of the data packet receive end and the parameter of the data packet transmit end. The statistics collection node may send the network KPI corresponding to the at least one phase category of the target service to the first detection node. In this way, the first detection node can obtain the network KPI corresponding to the at least one phase category of the target service. Then, the first detection node may add the obtained network KPI corresponding to the at least one phase category of the target service to the forwarding table. In this way, the first detection node can obtain, from the forwarding table, the network KPI corresponding to the target phase category.

In a possible implementation, the obtaining a network KPI corresponding to the target phase category includes: obtaining, from the current data packet, the network KPI corresponding to the target phase category.

In the solution shown in this application, the data packet transmit end may obtain a network KPI of the current data packet for a network in real time (in other words, the data packet transmit end may learn of a network KPI required by the current data packet), and the data packet transmit end may add the network KPI corresponding to the target phase category of the current data packet to the current data packet. In this way, the current data packet includes the network KPI corresponding to the target phase category. After receiving the current data packet, the first detection node may obtain, from the current data packet, the network KPI corresponding to the target phase category.

In a possible implementation, the method further includes: obtaining, from the current data packet, the target phase category corresponding to the current data packet; or determining, based on a feature of the current data packet, the target phase category corresponding to the current data packet.

In the solution shown in this application, when sending a data packet, a data transmit end may determine, based on a feature of the data packet, a phase category (that is, the target phase category) of a key phase to which the data packet belongs. Then, the data transmit end may add the target phase category to an application information header of the data packet, and send the target phase category together with the data packet to the first detection node. The first detection node receives the data packet, that is, obtains the current data packet, and may obtain, from the current data packet, the target phase category corresponding to the current data packet. After receiving the current data packet, the first detection node may analyze the feature of the current data packet by using a traffic classification algorithm (for example, deep packet parsing or a traffic identification model), and determine a service type of a service to which the current data packet belongs. Then, the first detection node assigns, based on at least one key phase corresponding to the service type, the current data packet to the key phase to which the current data packet belongs, and a phase category of the key phase is the target phase category corresponding to the current data packet. In this way, the first detection node can obtain the target phase category.

In a possible implementation, the target service is a live video service, and the key phase is any one of a head-end collection phase, an initial buffering phase, a scenario switching phase, or a head rotation rendering phase.

In a possible implementation, a network KPI corresponding to a category of the head-end collection phase and a network KPI corresponding to a category of the initial buffering phase include bandwidth; a network KPI corresponding to a category of the scenario switching phase includes maximum bandwidth, average bandwidth, and packet loss information of a key internal image; and a network KPI corresponding to a category of the head rotation rendering phase includes delay information.

In this case, because the bandwidth affects collection and initial buffering, the network KPI corresponding to the category of the head-end collection phase and the network KPI corresponding to the category of the initial buffering phase include the bandwidth; because the maximum bandwidth, the average bandwidth, and a packet loss of the key internal image affect scenario switching, the network KPI corresponding to the category of the scenario switching phase includes the maximum bandwidth, the average bandwidth, and the packet loss information of the key internal image; and because a delay affects head rotation rendering, the network KPI corresponding to the category of the head rotation rendering phase includes the delay information.

According to a second aspect, a service monitoring method is provided. The method includes: receiving a target data packet of a target service, where the target data packet includes detection indication information, the detection indication information includes a target phase category, and the target phase category is used to indicate a target phase in at least one key phase in which a current data packet is located in the target service; detecting the target data packet based on the detection indication information, to determine a network key performance indicator KPI of the target data packet; generating an abnormal event notification if determining that the network KPI of the target data packet does not meet a network KPI corresponding to the target phase category, where the network KPI corresponding to the target phase category is a network KPI that corresponds to the target phase of the target service when a QoE indicator meets a target ideal condition; and transmitting the abnormal event notification to a statistics collection node.

In the solution shown in this application, a second detection node receives the target data packet of the target service, where the target data packet includes the detection indication information, the detection indication information includes the target phase category, and the target phase category is used to indicate the target phase in the at least one key phase in which the current data packet is located in the target service. The second detection node may detect the target data packet based on the detection indication information. Specifically, the second detection node may obtain the target phase category from the detection indication information of the target data packet. Then, the second detection node determines the network KPI corresponding to the target phase category. The second detection node may detect only each network KPI that is indicated by the network KPI and that is of the target data packet. The second detection node may determine whether the network KPI of the target data packet meets the network KPI corresponding to the target phase category, and may generate the abnormal event notification if determining that the network KPI of the target data packet does not meet the network KPI corresponding to the target phase category. Then, the second detection node sends the abnormal event notification to the statistics collection node.

In this way, because an operating status of a service can be detected with every packet based on a phase category to which a data packet belongs, the operating status of the service can be learned of in time.

In a possible implementation, the method further includes: obtaining, from the detection indication information, the network KPI corresponding to the target phase category.

In a possible implementation, the method further includes: receiving a network KPI corresponding to at least one phase category of the target service, where the at least one phase category is respectively used to indicate the at least one key phase of the target service, the at least one phase category includes the target phase category, the network KPI corresponding to the at least one phase category is determined based on historical service data, a service type, and a key parameter of the target service, and the key parameter includes one or more of the target ideal condition of the QoE indicator, a parameter of a data packet transmit end and a parameter of a data packet receive end, or location information of a data packet receive end; adding the network KPI corresponding to the at least one phase category to a forwarding table; and determining, from the forwarding table, the network KPI corresponding to the target phase category.

In the solution shown in this application, before the target service is performed, the statistics collection node may send the network KPI respectively corresponding to the at least one phase category of the target service to each detection node in a detection domain. In this way, the second detection node can also obtain the network KPI corresponding to the at least one phase category of the target service. Then, the second detection node may add the network KPI corresponding to the at least one phase category of the target service to the forwarding table. Specifically, when sending the network KPI corresponding to the at least one phase category of the target service, the statistics collection node further sends an IP address of the data receive end. That the second detection node adds the network KPI corresponding to the at least one phase category of the target service to the forwarding table may be that the second detection node adds the network KPI corresponding to the at least one phase category to information corresponding to a destination IP address (that is, the IP address of the data packet receive end) in the forwarding table. In this way, when the second detection node does not include the network KPI corresponding to the target phase category in the detection indication information, the second detection node can find, from the forwarding table by using a destination IP address and the target phase category of the target data packet, the network KPI corresponding to the target phase category.

According to a third aspect, a service monitoring method is provided. The method includes: determining, based on historical service data, a service type, and a key parameter of a target service, a network KPI corresponding to at least one phase category of the target service, where the key parameter includes one or more of a target ideal condition of a QoE indicator, a parameter of a data packet transmit end and a parameter of a data packet receive end, or location information of a data packet receive end, the at least one phase category is used to indicate at least one key phase of the target service, and for any phase category, a network KPI corresponding to the phase category is a network KPI that corresponds to a key phase of the phase category when the QoE indicator meets the target ideal condition; and sending the network KPI corresponding to the at least one phase category.

In the solution shown in this application, a statistics collection node provides a user interface (UI) for operation and maintenance personnel, and the operation and maintenance personnel provides a plurality of pieces of historical service data of the target service for the statistics collection node through the user interface. Each piece of historical service data includes the network KPI and the QoE indicator. In addition, the operation and maintenance personnel may further input, through the user interface, the service type (for example, a live video service type) of the target service, the parameter of the data receive end and the parameter of the data transmit end, the location information of the data receive end and location information of the data transmit end, and the target ideal condition of the QoE indicator (where for example, a value of the QoE indicator is greater than a specific value). After obtaining the historical service data, the statistics collection node may assign the historical service data to the at least one key phase based on the service type and a feature of the historical service data. For example, the target service is a live video service, and the key phase includes a head-end collection phase, an initial buffering phase, a scenario switching phase, and the like. The target service is a cloud virtual reality live service, and the key phase includes a head-end collection phase, an initial buffering phase, a scenario switching phase, a head rotation rendering phase, and the like. Then, the statistics collection node may determine, based on the network KPI, the QoE indicator, and the key parameter that are included in each piece of historical service data, a network KPI that corresponds to at least one key phase when the QoE indicator meets the target ideal condition (where the network KPI corresponding to the at least one key phase may be obtained through neural network training, or may be obtained through fitting by using a relationship function between a network KPI and a QoE indicator, and this is not limited in this embodiment of this application). In this way, the statistics collection node can obtain the network KPI corresponding to the at least one phase of the target service. Therefore, the statistics collection node obtains the network KPI corresponding to the at least one phase category of the target service.

In a possible implementation, the target service is the live video service, the parameter of the data packet transmit end and the parameter of the data packet receive end include a key quality indicator (KQI) of image quality, and the key parameter further includes a video transmission mode and a video encoding/decoding standard.

In a possible implementation, the sending the network KPI corresponding to the at least one phase category includes: sending the network KPI corresponding to the at least one phase category to a $1^{st}$ detection node in a detection domain; or sending the network KPI corresponding to the at least one phase category to each detection node in a detection domain, where the detection domain is a network domain in which the target service is detected.

In this way, a network KPI corresponding to each phase category is provided for the detection node in the detection domain.

In a possible implementation, the method further includes: receiving an abnormal event notification sent by a detection node, where the abnormal event notification is used to indicate that a network KPI of a current data packet of the target service does not meet a network KPI corresponding to a target phase category, and the target phase category is used to indicate a target phase in the at least one key phase in which the current data packet is located in the target service.

In this way, the statistics collection node can learn of an operating status of a service in time based on the abnormal event notification.

According to a fourth aspect, this application provides a service monitoring apparatus. The apparatus includes a plurality of modules, and the plurality of modules implement the service monitoring method according to the first aspect by executing instructions.

According to a fifth aspect, this application provides a service monitoring apparatus. The apparatus includes a plurality of modules, and the plurality of modules implement the service monitoring method according to the second aspect by executing instructions.

According to a sixth aspect, this application provides a service monitoring apparatus. The apparatus includes a plurality of modules, and the plurality of modules implement the service monitoring method according to the third aspect by executing instructions.

According to a seventh aspect, this application provides a computing device. The computing device includes a memory and a processor. The processor executes computer instructions stored in the memory, so that the computing device performs the service monitoring method according to the first aspect.

According to an eighth aspect, this application provides a computing device. The computing device includes a memory and a processor. The processor executes computer instructions stored in the memory, so that the computing device performs the service monitoring method according to the second aspect.

According to a ninth aspect, this application provides a computing device. The computing device includes a memory and a processor. The processor executes computer instructions stored in the memory, so that the computing device performs the service monitoring method according to the third aspect.

According to a tenth aspect, a computer-readable storage medium is provided. The computer-readable storage medium stores computer instructions, and when the computer instructions in the computer-readable storage medium are executed by a computing device, the computing device is enabled to perform the service monitoring method according to the first aspect, or the computing device is enabled to implement functions of the apparatus according to the fourth aspect.

According to an eleventh aspect, a computer-readable storage medium is provided. The computer-readable storage medium stores computer instructions, and when the computer instructions in the computer-readable storage medium are executed by a computing device, the computing device is enabled to perform the service monitoring method according to the second aspect, or the computing device is enabled to implement functions of the apparatus according to the fifth aspect.

According to a twelfth aspect, a computer-readable storage medium is provided. The computer-readable storage medium stores computer instructions, and when the computer instructions in the computer-readable storage medium are executed by a computing device, the computing device is enabled to perform the service monitoring method according to the third aspect, or the computing device is enabled to implement functions of the apparatus according to the sixth aspect.

According to a thirteenth aspect, this application provides a computer program product. The computer program product includes computer instructions, and when the computer instructions are executed by a computing device, the computing device performs the service monitoring method according to the first aspect.

According to a fourteenth aspect, this application provides a computer program product. The computer program product includes computer instructions, and when the computer instructions are executed by a computing device, the computing device performs the service monitoring method according to the second aspect.

According to a fifteenth aspect, this application provides a computer program product. The computer program product includes computer instructions, and when the computer instructions are executed by a computing device, the computing device performs the service monitoring method according to the second aspect.

According to a sixteenth aspect, a service monitoring system is provided. The system includes a first detection node, a second detection node, and a statistics collection node. The first detection node is the apparatus according to the fourth aspect, the second detection node is the apparatus according to the fifth aspect, and the statistics collection node is the apparatus according to the sixth aspect.

DETAILED DESCRIPTION OF ILLUSTRATIVE EMBODIMENTS

To make objectives, technical solutions, and advantages of this application clearer, the following further describes implementations of this application in detail with reference to the accompanying drawings.

For ease of understanding of embodiments of this application, the following first describes concepts of terms used.

QoE is subjective perception of a user to quality and performance of a device, a network, a system, an application, or a service. In this application, the QoE is subjective perception to quality and performance of a service used by the user.

A network KPI mainly includes bandwidth of a network, delay information, packet loss information, and the like. The bandwidth refers to a volume of data that can be transmitted in unit duration.

A key quality indicator is a service quality parameter focusing on user experience for different services. For example, the service is a cloud virtual reality live service, and the KQI may include a resolution, a frame rate, and the like.

In this application, to resolve a problem that an operating status of a service cannot be learned in time, a service monitoring method is provided. The method may be implemented by a detection node or a statistics collection node. The detection node and the statistics collection node may be a hardware apparatus, or may be a software apparatus.

When the detection node is the software apparatus, the detection node may be a router, a switch, or the like implemented by using software. When the detection node is the hardware apparatus, the detection node may be a router, a switch, or the like implemented by using hardware.

When the statistics collection node is the software apparatus, the statistics collection node may be a program or the like deployed on a hardware device. When the statistics collection node is the hardware apparatus, the statistics collection node may be a computing device such as a server.

In embodiments of this application, the detection node may establish a communication connection to the statistics collection node. In some cases, the statistics collection node may send, to the detection node, a network KPI corresponding to a phase category of each phase of a service (where a detailed process is described below).

Figure 1:
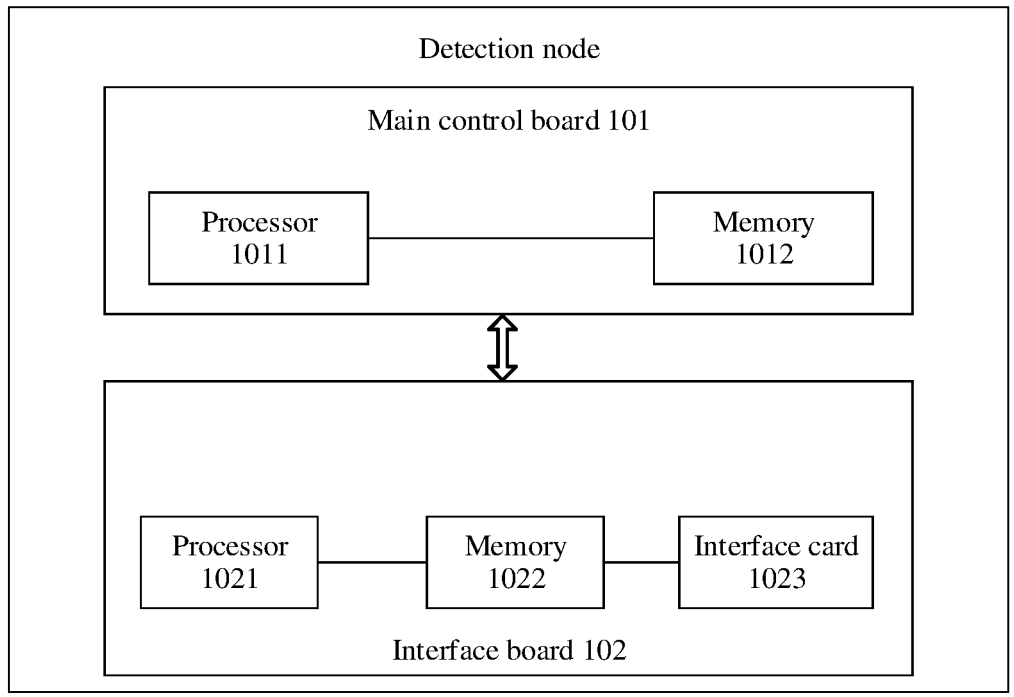
FIG. 1 is a schematic diagram of a structure of a detection node according to an example embodiment of this application.

When the detection node is the hardware apparatus, as shown in FIG. 1, a schematic diagram of a structure of a router or a switch is provided. The detection node includes a main control board 101 and an interface board 102. The main control board 101 includes a processor 1011 and a memory 1012. The interface board 102 includes a processor 1021, a memory 1022, and an interface card 1023. A communication connection is established between the main control board 101 and the interface board 102.

The processor 1011 may be a central processing unit (CPU), an application-specific integrated circuit (ASIC), or the like. The processor 302 may include one or more chips. The memory 1012 may be a read only memory (ROM), a static storage device, a dynamic storage device, or a random access memory (RAM). The memory 1012 may store computer instructions. When the computer instructions stored in the memory 1012 are executed by the processor 1011, the processor 1011 performs the service monitoring method.

The processor 1021 may be a CPU, an application-specific integrated circuit ASIC, or the like. The processor 1021 may include one or more chips. The memory 1022 may be a ROM, a static storage device, a dynamic storage device, or a RAM. The memory 1022 may store computer instructions. When the computer instructions stored in the memory 1022 are executed by the processor 1021, the processor 1021 performs the service monitoring method. The interface board 102 may implement packet receiving and sending processing.

Figure 2:
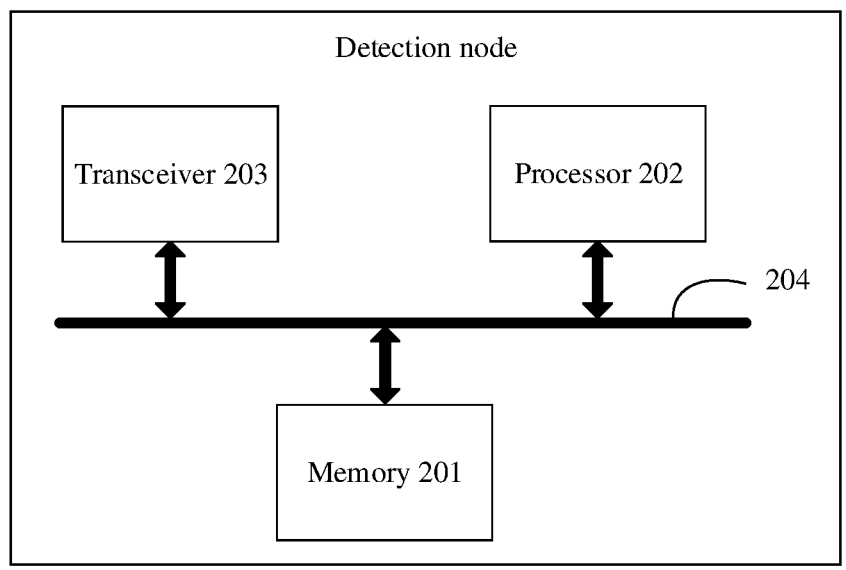
FIG. 2 is a schematic diagram of a structure of a detection node according to an example embodiment of this application.

When the detection node is the hardware apparatus, as shown in FIG. 2, another schematic diagram of a structure of a router or a switch is further provided. The detection node includes a memory 201, a processor 202, a transceiver 203, and a bus 204. The memory 201, the processor 202, and the transceiver 203 are communicatively connected to each other through the bus 204.

The memory 201 may be a ROM, a static storage device, a dynamic storage device, or a RAM. The memory 201 may store computer instructions. When the computer instructions stored in the memory 201 are executed by the processor 202, the processor 202 and the transceiver 203 are configured to perform the service monitoring method. The memory may further store data. For example, a part of the memory 201 is used to store data required for the service monitoring method, and is used to store intermediate data or result data in a process of program execution.

The processor 202 may be a general-purpose CPU, an application ASIC, a graphics processing unit (GPU), or any combination thereof. The processor 202 may include one or more chips.

The transceiver 203 uses a transceiver module, for example but not for limitation, a transceiver, to implement communication between the detection node and another device or a communication network. For example, data required for monitoring a service may be obtained by using the transceiver 203.

The bus 204 may include a path for transmitting information between components (for example, the memory 201, the processor 202, and the transceiver 203) of the detection node.

Figure 3:
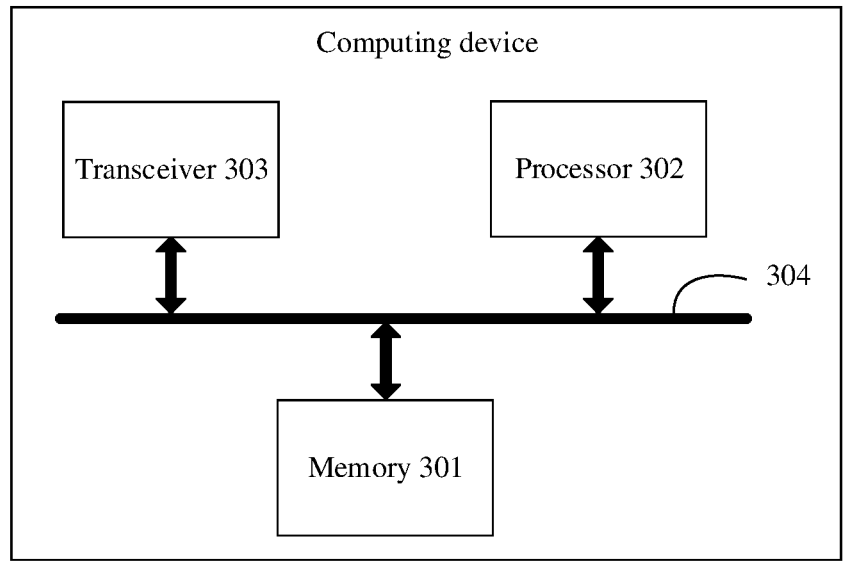
FIG. 3 is a schematic diagram of a structure of a computing device according to an example embodiment of this application.

When the statistics collection node is the computing device, as shown in FIG. 3, the computing device includes a memory 301, a processor 302, a transceiver 303, and a bus 304. The memory 301, the processor 302, and the transceiver 303 are communicatively connected to each other through the bus 304.

The memory 301 may be a ROM, a static storage device, a dynamic storage device, or a RAM. The memory 301 may store computer instructions. When the computer instructions stored in the memory 301 are executed by the processor 302, the processor 302 and the transceiver 303 are configured to perform the service monitoring method. The memory may further store data. For example, a part of the memory 301 is used to store data required for the service monitoring method, and is used to store intermediate data or result data in a process of program execution.

The processor 302 may be a general-purpose CPU, an application ASIC, a graphics processing unit, or any combination thereof. The processor 302 may include one or more chips.

The transceiver 303 uses a transceiver module, for example but not for limitation, a transceiver, to implement communication between a network device and another device or a communication network. For example, data required for monitoring a service may be obtained by using the transceiver 303.

The bus 304 may include a path for transmitting information between components (for example, the memory 301, the processor 302, and the transceiver 303) of the network device.

An embodiment of this application provides a service monitoring method. The method may be applied to a scenario shown in FIG. 4. The scenario includes a data packet transmit end, a detection domain, a data packet receive end, and a statistics collection node of a service. All or some of detection nodes in the detection domain are configured to detect whether a network KPI of a data packet of the service meets a network KPI of a key phase to which the data packet belongs. The data packet transmit end is configured to send the data packet of the service to the data packet receive end.

The data packet receive end may be a terminal device of a user. The statistics collection node may be configured to receive an abnormal event notification sent by the detection node in the detection domain.

Figure 4:
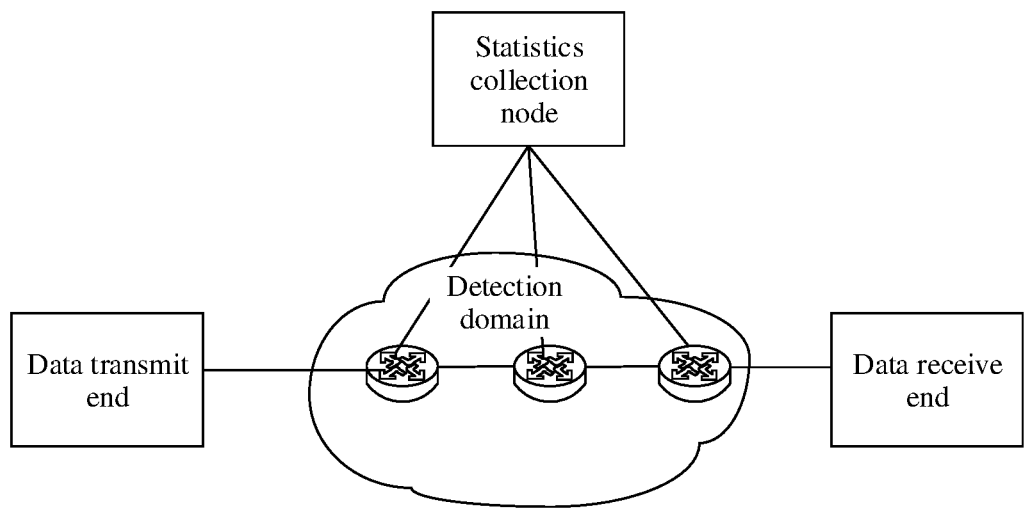
FIG. 4 is a schematic diagram of an application scenario of a service monitoring method according to an example embodiment of this application.

In addition, in the scenario in FIG. 4, the statistics collection node may be further configured to determine a network KPI corresponding to a phase category of at least one key phase of the service, and deliver the network KPI corresponding to the phase category of the at least one key phase of the service to a node in the detection domain.

Figure 5:
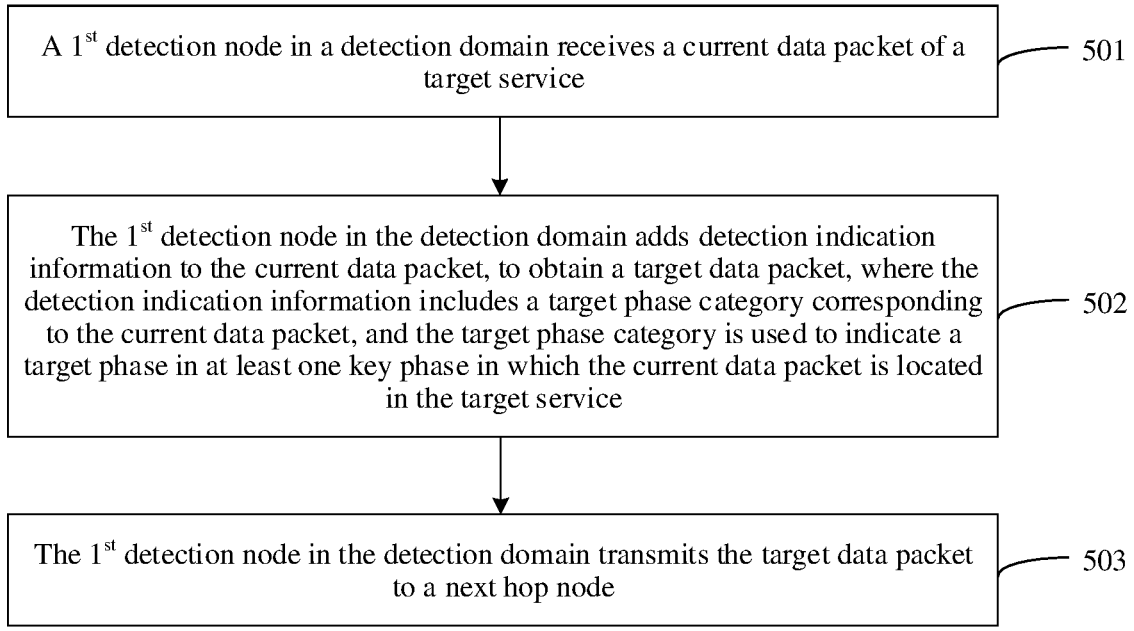
FIG. 5 is a schematic flowchart of a service monitoring method according to an example embodiment of this application.

In this embodiment of this application, FIG. 4 is used as an example to describe a procedure of the service monitoring method, as shown in FIG. 5.

Step 501. A $1^{st}$ detection node in a detection domain receives a current data packet of a target service.

The detection domain may be a network domain in which the target service is detected. The $1^{st}$ detection node in the detection domain may be a $1^{st}$ node that a data packet of the target service passes through after entering the detection domain, or another node that a data packet of the target service passes through after entering the detection domain. The target service is a service to be monitored, for example, a live video service (a cloud virtual reality live service, a three-dimensional (3D) live video service, or the like). The target service may be indicated by using 5-tuple information, or may be indicated by using at least one tuple (for example, an IP address and a port number of a data packet transmit end) in the 5-tuple information. Certainly, the target service may alternatively be indicated by using, for example, a type of the target service. This is not limited in this embodiment of this application. The current data packet is a data packet currently processed by the detection node.

In this embodiment, the data packet transmit end of the target service sends a data packet, the data packet enters the detection domain through network transmission, and the $1^{st}$ detection node in the detection domain receives the data packet (where the data packet is the current data packet). For ease of description, the $1^{st}$ detection node in the detection domain is a first detection node for short below.

Step 502. The $1^{st}$ detection node in the detection domain adds detection indication information to the current data packet, to obtain a target data packet.

The detection indication information includes a target phase category corresponding to the current data packet. The target phase category is used to indicate a target phase in at least one key phase in which the current data packet is located in the target service. The detection indication information is used to indicate to detect the current data packet. The detection indication information may be an in-situ flow information telemetry (iFiT) instruction header, or may be an in-situ operation, administration, and maintenance (iOAM) instruction header. Certainly, the detection indication information may alternatively be another instruction header used for detection with every flow. This is not limited in this embodiment of this application.

In this embodiment, the first detection node may obtain a phase category (that is, the target phase category) of the current data packet. The target phase category may be used to indicate the target phase in the at least one key phase in which the current data packet is located in the target service. "At least one" herein indicates one or more, that is, the target service may be in one key phase or a plurality of key phases.

Then, the first detection node may add the detection indication information to the current data packet, to obtain the target data packet. The detection indication information includes the target phase category corresponding to the current data packet. Specifically, the target phase category may be an extension field in the iFiT instruction header, or may be an extension field in the iOAM instruction header.

Step 503. The $1^{st}$ detection node in the detection domain transmits the target data packet to a next hop node.

In this embodiment, after obtaining the target data packet, the first detection node may query a forwarding table for a destination address in the target data packet, to obtain the next hop node. Then, the first detection node sends the target data packet to the next hop node.

It should be noted that the first detection node may alternatively add the detection indication information to only some data packets based on a service requirement. For example, the detection indication information is added every two data packets.

In a possible implementation, in step 502, the phase category of the current data packet may be determined in the following two manners.

Manner 1: The first detection node obtains, from the current data packet, the target phase category corresponding to the current data packet.

In this embodiment, when sending a data packet, the data transmit end may determine, based on a feature of the data packet, a phase category (that is, the target phase category) of a key phase to which the data packet belongs. Then, the data transmit end may add the target phase category to an application information header of the data packet, and send the target phase category together with the data packet to the first detection node.

The first detection node receives the data packet, that is, obtains the current data packet, and may obtain, from the current data packet, the target phase category corresponding to the current data packet.

Manner 2: The first detection node determines, based on a feature of the current data packet, the target phase category corresponding to the current data packet.

In this embodiment, after receiving the current data packet, the first detection node may analyze the feature of the current data packet by using a traffic classification algorithm (for example, deep packet parsing or a traffic identification model), and determine a service type of a service to which the current data packet belongs. Then, the first detection node assigns, based on at least one key phase corresponding to the service type, the current data packet to the key phase to which the current data packet belongs, and a phase category of the key phase is the target phase category corresponding to the current data packet. For example, when the target service is the live video service, and an interval between the current data packet and a previous data packet is less than a specific value, it may be determined that the current data packet is in a scenario switching phase, and the target phase category is a phase category of the scenario switching phase.

In a possible implementation, when another detection node other than the first detection node in the detection domain has no network KPI corresponding to the target phase category, the detection indication information further includes the network KPI corresponding to the target phase category. A processing process is as follows:

The first detection node obtains the network KPI corresponding to the target phase category, and sets, in the detection indication information, the network KPI corresponding to the target phase category.

The network KPI corresponding to the target phase category refers to a network KPI that is required in the key phase indicated by the target phase category and that is under a QoE indicator wanted by operation and maintenance personnel (that is, the QoE indicator meets a target ideal condition). A target value varies depending on different QoE indicator standards. For example, the QoE indicator standard is a scoring standard, the QoE indicator is 0 to 5, 5 represents a highest QoE indicator, 0 represents a lowest QoE indicator, and the target ideal condition is that a value of the QoE indicator is greater than or equal to 4.

In this embodiment, the first detection node may obtain the network KPI corresponding to the target phase category, and then set the network KPI in the detection indication information of the current data packet. In this way, the another detection node in the detection domain can obtain, from the detection indication information, the network KPI corresponding to the target phase category.

In a possible implementation, the first detection node may determine the network KPI corresponding to the target phase category in the following two manners.

Manner 1: The first detection node obtains, from the current data packet, the network KPI corresponding to the target phase category.

In this embodiment, the data packet transmit end may obtain a network KPI of the current data packet for a network in real time (in other words, the data packet transmit end may learn of a network KPI required by the current data packet) based on an operating time sequence of the target service. For example, the target service is a video service, and the data packet transmit end may learn of data in a collection phase, a data packet in an initial buffering phase, and the like. The data packet transmit end may add the network KPI corresponding to the target phase category of the current data packet to the current data packet. In this way, the current data packet includes the network KPI corresponding to the target phase category. After receiving the current data packet, the first detection node may obtain, from the current data packet, the network KPI corresponding to the target phase category. For example, the data transmit end supports an application-aware internet protocol version 6 networking (APN6) technology. In this case, the data packet has carried the required network KPI. In this way, the first detection node can obtain, from the data packet, the network KPI required by the data packet.

In a possible implementation, the data packet transmit end may include the network KPI in an application information header of the data packet.

Manner 2: The first detection node obtains a network KPI corresponding to at least one phase category of the target service, where the at least one phase category is used to indicate the at least one key phase of the target service, the at least one phase category includes the target phase category, the network KPI corresponding to the at least one phase category is determined based on historical service data, a service type, and a key parameter of the target service, and the key parameter includes one or more of the target ideal condition of the QoE indicator, location information of a data packet receive end, or a parameter of a data packet receive end and a parameter of the data packet transmit end; adds the network KPI corresponding to the at least one phase category to the forwarding table; and determines, from the forwarding table, the network KPI corresponding to the target phase category.

When the at least one phase category is a plurality of phase categories, each phase category corresponds to a network KPI of the phase category.

In this embodiment, a node (for example, a statistics collection node) outside the detection domain may determine, based on the historical service data, the service type, and the key parameter of the target service, the network KPI corresponding to the at least one phase category of the target service (where the process is described below). The key parameter includes one or more of the target ideal condition of the QoE indicator, the location information of the data packet receive end, or the parameter of the data packet receive end and the parameter of the data packet transmit end. The statistics collection node may send the network KPI corresponding to the at least one phase category of the target service to the first detection node. In this way, the first detection node can obtain the network KPI corresponding to the at least one phase category of the target service.

Then, the first detection node may add the obtained network KPI corresponding to the at least one phase category of the target service to the forwarding table. Specifically, when sending the network KPI corresponding to the at least one phase category of the target service, the statistics collection node further sends an IP address of the data packet receive end. That the first detection node adds the network KPI corresponding to the at least one phase category of the target service to the forwarding table may be that the first detection node adds the network KPI corresponding to the at least one phase category to information corresponding to a destination IP address (that is, the IP address of the data packet receive end) in the forwarding table. When the network KPI corresponding to the at least one phase category is added to the forwarding table, a timer may be set for the network KPI. When the timer expires, the network KPI corresponding to the at least one phase category is deleted. In this way, valid duration may be set for the network KPI corresponding to the at least one phase category.

Subsequently, the first detection node finds, from the forwarding table by using the target phase category, the network KPI corresponding to the target phase category.

In addition, after a node outside the detection domain sends, to the first detection node, the network KPI corresponding to the at least one phase category of the target service, the first detection node may perform, based on the network KPI corresponding to the at least one phase category detected by the first detection node, update processing on the received network KPI corresponding to the at least one phase category of the target service, so that the first detection node obtains a more accurate network KPI corresponding to the at least one phase category of the target service. For example, if the network KPI corresponding to the at least one phase category of the target service is obtained based on a neural network algorithm, the first detection node may optimize a model obtained by using the neural network algorithm, to obtain a more accurate network KPI corresponding to the at least one phase category of the target service.

In addition, after receiving the current data packet, the first detection node may determine a network KPI of the current data packet, and then determine whether the network category. If the network KPI of the current data packet meets the network KPI corresponding to the target phase category, an abnormal event notification may be generated. Then, the first detection node may add the abnormal event notification to the detection indication information of the target data packet, or the first detection node may send the abnormal event notification to a node configured to collect statistics about the abnormal event notification. Herein, the node that determines the network KPI corresponding to the at least one phase category and the node that receives the abnormal event notification may be a same node. Certainly, the two nodes may alternatively be different nodes. This is not limited in this embodiment of this application.

In this way, the $1^{st}$ detection node in the detection domain adds the detection indication information to the current data packet, and the another detection node in the detection domain detects the network KPI of the target data packet, to determine whether the network KPI of the target data packet meets a network KPI of a key phase in which the target data packet is located and determine whether to generate the abnormal event notification (where the detailed process is described below.) Therefore, an operating status of the target service is learned of in time based on the detection with every flow.

Figure 6:
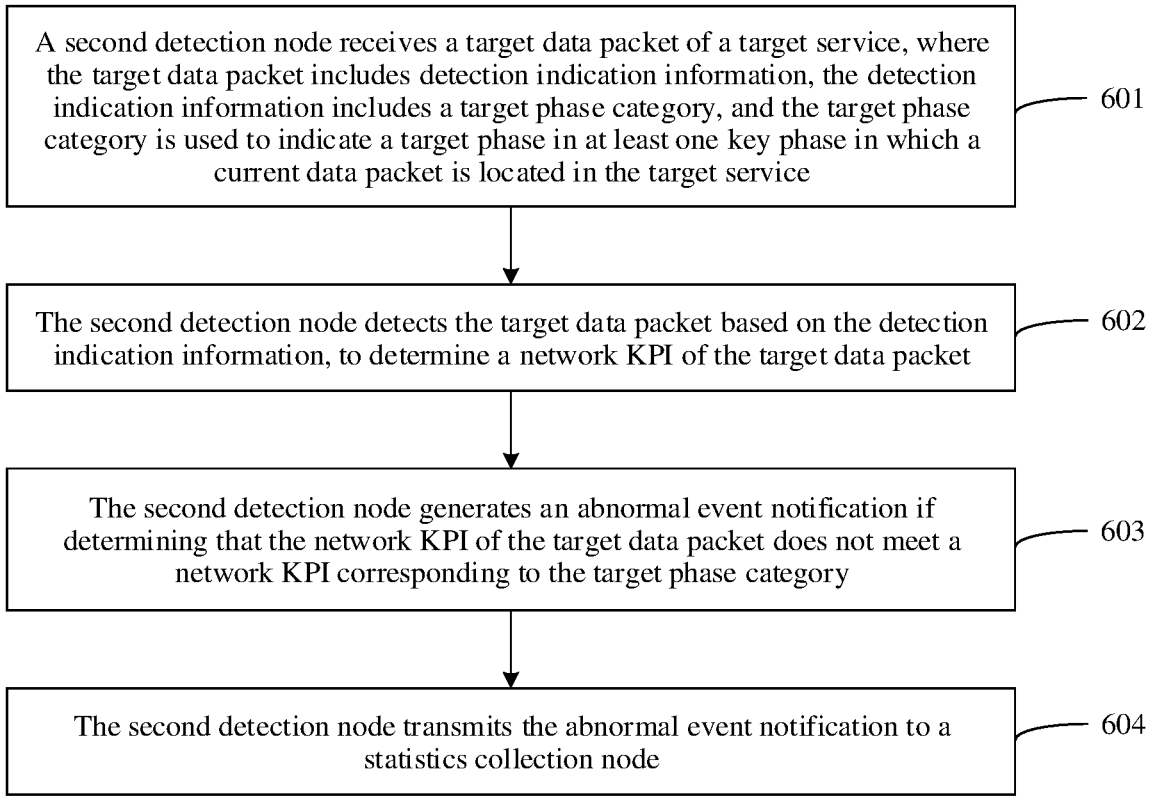
FIG. 6 is a schematic flowchart of a service monitoring method according to an example embodiment of this application.

In correspondence to the procedure shown in FIG. 5, as shown in FIG. 6, an embodiment of this application further provides a processing process of another detection node (which may be referred to as a second detection node below) other than a first detection node in a detection domain.

Step 601. The second detection node receives a target data packet of a target service, where the target data packet includes detection indication information, the detection indication information includes a target phase category, and the target phase category is used to indicate a target phase in at least one key phase in which a current data packet is located in the target service.

In this embodiment, in the procedure in FIG. 5, the first detection node in the detection domain sends the target data packet to the next hop node of the first detection node. The another detection node (that is, the second detection node) in the detection domain may receive a data packet of the target service.

Step 602. The second detection node detects the target data packet based on the detection indication information, to determine a network KPI of the target data packet.

In this embodiment, the second detection node may detect the target data packet based on the detection indication information. Specifically, the second detection node may obtain the target phase category from the detection indication information of the target data packet. Then, the second detection node determines a network KPI corresponding to the target phase category. The second detection node may detect only each network KPI that is indicated by the network KPI and that is of the target data packet. For example, if the network KPI corresponding to the target phase category includes a delay, only the delay of the target data packet may be detected. For another example, the network KPI corresponding to the target phase category includes a quantity of lost packets, and whether a sequence number of a previous data packet of the target data packet and a sequence number of the target data packet are consecutive may be detected. If the sequence numbers are consecutive, the second detection node determines that the quantity of lost packets of the target data packet is 0; or if the sequence numbers are not consecutive, the second detection node determines that the quantity of lost packets of the target data packet is a difference value between the sequence number of the target data packet and the sequence number of the previous data packet of the target data packet.

It should be noted herein that, if the network KPI includes bandwidth, the second detection node may determine a data volume of a transmitted data packet in unit duration before receiving of the target data packet, that is, obtain the bandwidth. If the network KPI includes a delay, the second detection node may determine duration from a time point at which the target data packet enters the second detection node to a time point at which the target data packet is sent from the second detection node, that is, obtain the delay. If the network KPI includes a quantity of lost packets, the second detection node determines a difference value between a sequence number of the target data packet and a sequence number of a previous data packet of the target data packet, that is, obtains the quantity of lost packets.

Step 603. The second detection node generates an abnormal event notification if determining that the network KPI of the target data packet does not meet the network KPI corresponding to the target phase category.

In this embodiment, the second detection node may determine whether the network KPI of the target data packet meets the network KPI corresponding to the target phase category, and may generate the abnormal event notification if determining that the network KPI of the target data packet does not meet the network KPI corresponding to the target phase category. For example, if a delay in the network KPI of the target data packet is 10 milliseconds, and a delay in the network KPI corresponding to the target phase category is less than or equal to 8 milliseconds, it is determined that the network KPI of the target data packet does not meet the network KPI corresponding to the target phase category. If a quantity of lost packets in the network KPI of the target data packet is 3, and a quantity of lost packets included in the network KPI corresponding to the target phase category is less than or equal to 2, it is determined that the network KPI of the target data packet does not meet the network KPI corresponding to the target phase category. Specifically, the abnormal event notification may further include the target phase category. In this way, a statistics collection node can learn that an exception occurs when a data packet in a key phase of the target phase category is transmitted.

In addition, if it is determined that the network KPI of the target data packet meets the network KPI corresponding to the target phase category, it is considered that this is a normal event, a current network KPI can meet a service requirement, and a QoE indicator of a user also meets a target ideal condition (that is, meets an operation and maintenance requirement). In this case, the abnormal event notification is not generated.

It should be noted herein that, when the network KPI corresponding to the target phase category includes a plurality of types of network KPIs, that the network KPI of the target data packet does not meet the network KPI corresponding to the target phase category means that any one or more types of network KPIs in the network KPI of the target data packet do not meet the network KPI corresponding to the target phase category.

Step 604. The second detection node transmits the abnormal event notification to the statistics collection node.

In this embodiment, after generating the abnormal event notification, the second detection node may perform either of two types of processing. The first type is: The second detection node adds the abnormal event notification to the target data packet, and transmits the target data packet to a next hop node until a last detection node in the detection domain sends the target data packet to the statistics collection node. The second type is: The second detection node directly sends the abnormal event notification to the statistics collection node. It should be noted herein that in the first type, only the last detection node in the detection domain reports all abnormal event notifications. In the second type, any detection node in the detection domain may send the abnormal event notification to the statistics collection node provided that the detection node generates the abnormal event notification.

After receiving the abnormal event notification, the statistics collection node may send the abnormal event notification to a terminal of operation and maintenance personnel. Certainly, if the statistical node is the terminal of the operation and maintenance personnel, the terminal of the operation and maintenance personnel directly obtains the abnormal event notification.

In a possible implementation, the detection indication information of the target data packet includes the network KPI corresponding to the target phase category. In this way, the second detection node can obtain the network KPI corresponding to the target phase category from the detection indication information.

In another possible implementation, the detection indication information of the target data packet does not include the network KPI corresponding to the target phase category. In this case, a forwarding table of the second detection node includes a network KPI respectively corresponding to at least one phase category of the target service. Specifically, before the target service is performed, the statistics collection node may send, to each detection node in the detection domain, the network KPI respectively corresponding to the at least one phase category of the target service. In this way, the second detection node can also obtain the network KPI corresponding to the at least one phase category of the target service. Then, the second detection node may add the network KPI corresponding to the at least one phase category of the target service to the forwarding table. Specifically, when sending the network KPI corresponding to the at least one phase category of the target service, the statistics collection node further sends an IP address of a data receive end. That the second detection node adds the network KPI corresponding to the at least one phase category of the target service to the forwarding table may be that the second detection node adds the network KPI corresponding to the at least one phase category to information corresponding to a destination IP address (that is, the IP address of the data packet receive end) in the forwarding table. When the network KPI corresponding to the at least one phase category is added to the forwarding table, a timer may be set for the network KPI. When the timer expires, the network KPI corresponding to the at least one phase category is deleted. In this way, valid duration may be set for the network KPI corresponding to the at least one phase category. Certainly, herein, the network KPI respectively corresponding to the at least one phase category of the target service may not be directly sent by the statistics collection node to the detection node in the detection domain. The statistics collection node may deliver the network KPI respectively corresponding to the at least one phase category of the target service to a controller in the detection domain. The controller delivers the network KPI respectively corresponding to the at least one phase category of the target service to the detection node in the detection domain.

In this way, when the second detection node does not include the network KPI corresponding to the target phase category in the detection indication information, the second detection node can find, from the forwarding table by using a destination IP address and the target phase category of the target data packet, the network KPI corresponding to the target phase category.

It should be noted that, in the embodiment in FIG. 6, when each detection node sends the abnormal event notification to the statistics collection node, processing performed by detection nodes other than the $1^{st}$ detection node in the detection domain is basically the same. However, the last detection node is further responsible for deleting an instruction header that is in the target data packet and that includes the detection indication information. When only the last detection node in the detection domain sends the abnormal event notification to the statistics collection node, when generating the abnormal event notification, the detection node other than the last detection node in the detection domain adds the abnormal event notification to the target data packet until the target data packet arrives at the last detection node in the detection domain, and the last detection node obtains the abnormal event notification from the target data packet, and sends the abnormal event notification to the statistics collection node. Certainly, if the last detection node also generates the abnormal event notification herein, the last detection node also sends the generated abnormal event notification to the statistics collection node.

In this embodiment, a KPI of a network corresponding to a phase category of each data packet is compared with a network KPI when the QoE indicator meets the target ideal condition, to obtain the abnormal event notification. The second detection node notifies the statistics collection node as soon as possible, so that the operation and maintenance personnel learn of an operating status of a service in time. In addition, the second detection node sends the abnormal event notification to the statistics collection node only when the network KPI of the target data packet does not meet the network KPI corresponding to the target phase category, and a normal event is not monitored, so that a volume of data sent to the statistics collection node can be reduced. In addition, the data packet of the service is assigned to the at least one key phase, and the network KPI is monitored at each key phase, so that quality of experience of the user can be ensured as much as possible, and network resource utilization can be optimized.

Figure 7:
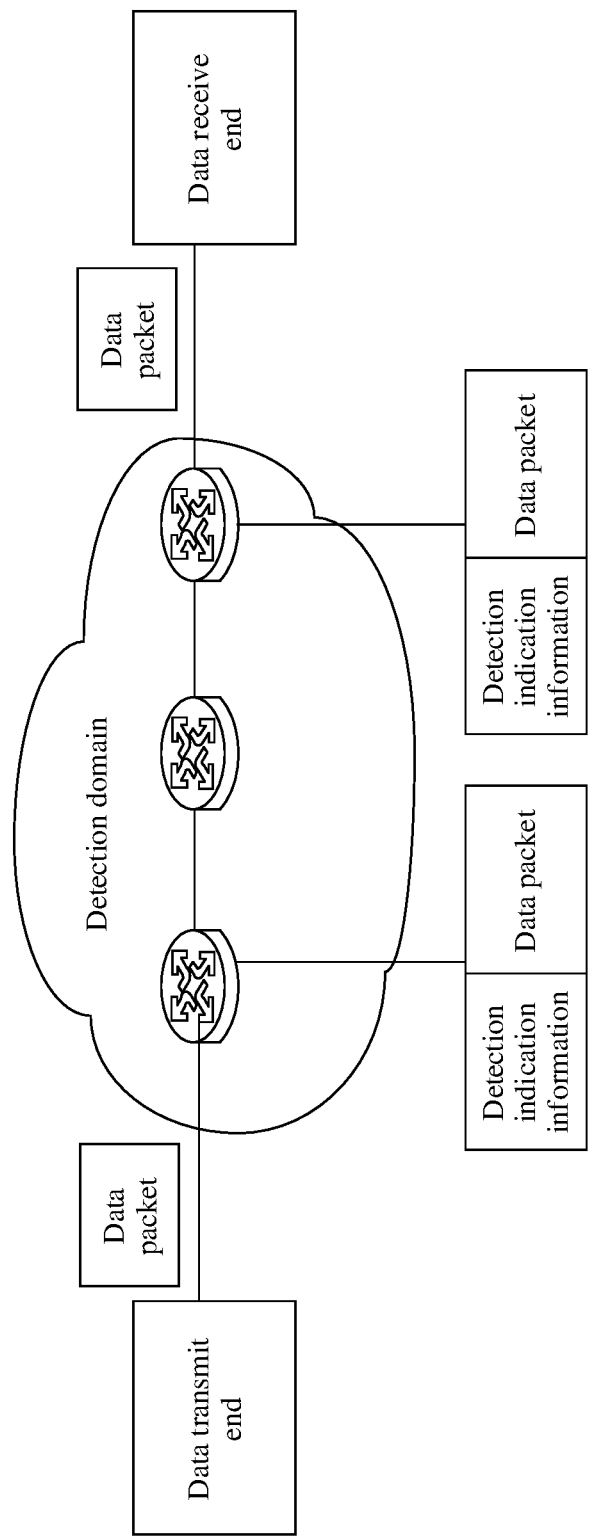
FIG. 7 is a schematic diagram of transmission of a data packet according to an example embodiment of this application.

In addition, to better understand this embodiment of this application, a schematic diagram of transmitting a target data packet is further provided. As shown in FIG. 7, a data transmit end sends a data packet to a $1^{st}$ detection node in a detection domain, the $1^{st}$ detection node adds detection indication information, and each detection node in the detection domain detects the target data packet.

In the procedure in FIG. 6, it should be noted that each node that the target data packet passes through in the detection domain may be the second detection node, or some nodes that the target data packet passes through in the detection domain are the second detection node. In the latter case, some nodes that the target data packet passes through are selected as the second detection node.

In this embodiment of this application, in a scenario, an application layer of the data transmit end does not notify a network layer of a network KPI corresponding to at least one phase category of a target service (that is, the data packet does not carry the network KPI). In this embodiment of this application, the network KPI corresponding to the at least one phase category of the target service may be determined in the following manner. A processing process is as follows:

A statistics collection node determines, based on historical service data, a service type, and a key parameter of the target service, the network KPI corresponding to the at least one phase category of the target service, where the key parameter includes one or more of a target ideal condition of a QoE indicator, a parameter of a data receive end and a parameter of the data transmit end, or location information of a terminal, the at least one phase category is used to indicate at least one key phase of the target service, and for any phase category, a network KPI corresponding to the phase category is a network KPI that corresponds to a key phase of the phase category when the QoE indicator meets the target ideal condition; and sends the network KPI corresponding to the at least one phase category.

Figure 8:
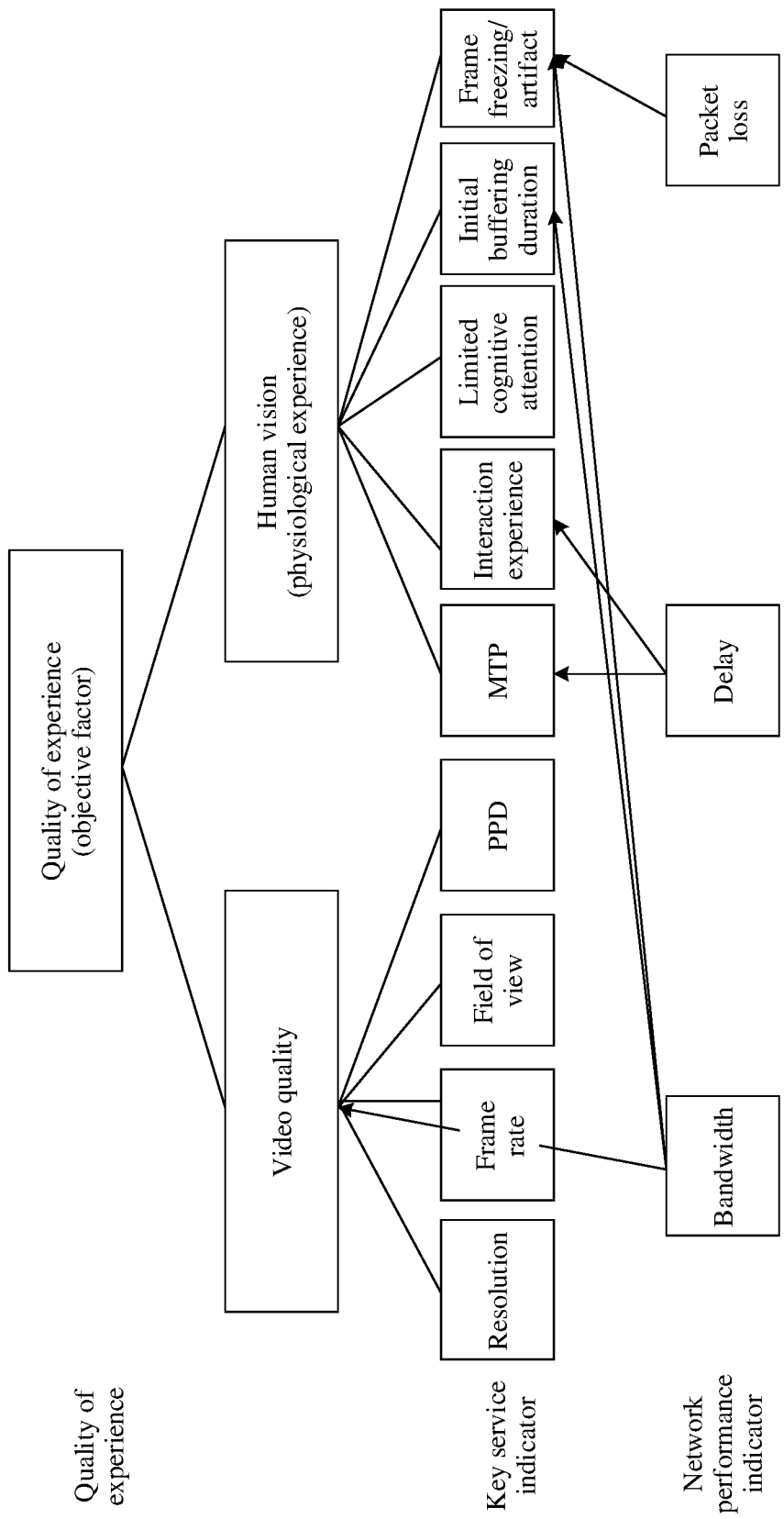
FIG. 8 is a schematic diagram of a relationship between a QoE indicator and a network KPI of a video according to an example embodiment of this application.

In this embodiment, factors that affect QoE include both subjective factors of a user and objective factors. In this embodiment, only the objective factors are considered. For example, the target service is a cloud virtual reality live service. As shown in FIG. 8, objective factors of QoE mainly include video quality and human vision (physiological experience), KQIs that affect the video quality mainly include a resolution, a frame rate, a field of view, a PPD, and the like, and KQIs that affect the human vision mainly include the media transfer protocol (MTP), interaction experience, a limited cognitive capability, initial buffering duration, frame freezing/an artifact, and the like. Bandwidth in the network KPI affects the video quality, the initial buffering duration, the frame freezing/the artifact, and the like. A delay in the network KPI affects the MTO and the interaction experience. A packet loss in the network KPI affects the frame freezing/the artifact, and the like.

The statistics collection node provides a user interface (UI) for operation and maintenance personnel, and the operation and maintenance personnel provides a plurality of pieces of historical service data of the target service for the statistics collection node through the user interface. Each piece of historical service data includes the network KPI and the QoE indicator. In addition, the operation and maintenance personnel may further input, through the user interface, the service type (for example, a live video service type) of the target service, the parameter of the data receive end and the parameter of the data transmit end, location information of the data receive end and location information of the data transmit end, and the target ideal condition of the QoE indicator (where for example, a value of the QoE indicator is greater than a specific value). After obtaining the historical service data, the statistics collection node may assign the historical service data to the at least one key phase based on the service type and a feature of the historical service data. For example, the target service is a live video service, and the key phase includes a head-end collection phase, an initial buffering phase, a scenario switching phase, and the like. The target service is a cloud virtual reality live service, and the key phase includes a head-end collection phase, an initial buffering phase, a scenario switching phase, a head rotation rendering phase, and the like. It should be noted herein that the feature of the historical service data may include features such as a packet interval and a packet delay.

Then, the statistics collection node may determine, based on the network KPI, the QoE indicator, and the key parameter that are included in each piece of historical service data, a network KPI that corresponds to at least one key phase when the QoE indicator meets the target ideal condition (where the network KPI corresponding to the at least one key phase may be obtained through neural network training, or may be obtained through fitting by using a relationship function between a network KPI and a QoE indicator, and this is not limited in this embodiment of this application). In this way, the statistics collection node can obtain the network KPI corresponding to the at least one key phase of the target service. Therefore, the statistics collection node obtains the network KPI corresponding to the at least one phase category of the target service. Then, the statistics collection node may send the network KPI corresponding to the at least one phase category to the 1$^{st}$ detection node in the detection domain. In this way, the 1$^{st}$ detection node may obtain the network KPI corresponding to the at least one phase category, and subsequently may add a network KPI corresponding to the target phase category to the detection indication information. Alternatively, the statistics collection node may send the network KPI respectively corresponding to the at least one phase category to each detection node in the detection domain. In this way, each detection node may add the network KPI respectively corresponding to the at least one phase category to a forwarding table. It should be noted herein that, in a neural network algorithm, the key parameter mainly affects parameters of some layers, and the like. When a relationship function is used for fitting, the key parameter mainly affects a parameter defined in the relationship function. The foregoing process of determining the network KPI corresponding to the at least one key phase is actually a process in which the target ideal condition of the QoE indicator wanted by a carrier is specified (that is, only when the QoE indicator meets the target ideal condition) for determining the network KPI corresponding to the at least one key phase.

For example, when the target service is the cloud virtual reality live service in the live video service, the parameter of the data packet receive end may include a KQI of image quality. The KQI may include a resolution, a frame rate, a field of view (FoV), a pixel per degree (PPD), and the like. The key parameter may further include a video encoding/decoding standard (such as h.264 and h.265) and a video transmission mode. The video transmission mode may include a full-view mode or a field of view transmission mode.

It should be noted that, for the live video service, a reason for assigning the target service to the at least one key phase is as follows: Factors related to the bandwidth in the network KPI include the video quality and limited cognitive attention in human visual experience. Content of a video affects encoding compression efficiency, affecting the bandwidth in the network KPI. In addition, some behavior such as rollback and fast-forward of the user watching the video also affects a requirement for the network KPI. Therefore, in time domain of the live video service, a requirement of the QoE indicator for the network KPI changes dynamically, and is not a static network KPI. For example, bandwidth in a network KPI corresponding to a key phase of head-end collection is 2.5 switching bandwidth; bandwidth in a network KPI corresponding to a key phase of initial buffering is 250 megabits per second; and maximum bandwidth in a network KPI corresponding to a key phase of scenario switching is 500 megabits per second, average bandwidth is 250 megabits per second, and a quantity of lost packets of a key content image (that is, a key I-frame) is 0. A delay in a network KPI corresponding to a key phase of head-end rendering is 20 ms.

It should be further noted herein that, a reason for inputting the parameter of the data transmit end and the parameter of the data receive end is as follows: For a service, the data transmit end and the data receive end affect QoE of the user for the service. For example, the target service is a live video service, the data transmit end is a video image collection end, and the data receive end is a video image play end. Certainly, resolutions and frame rates of the data transmit end and the data transmit end affect QoE of the user watching a live video image.

Figure 9:
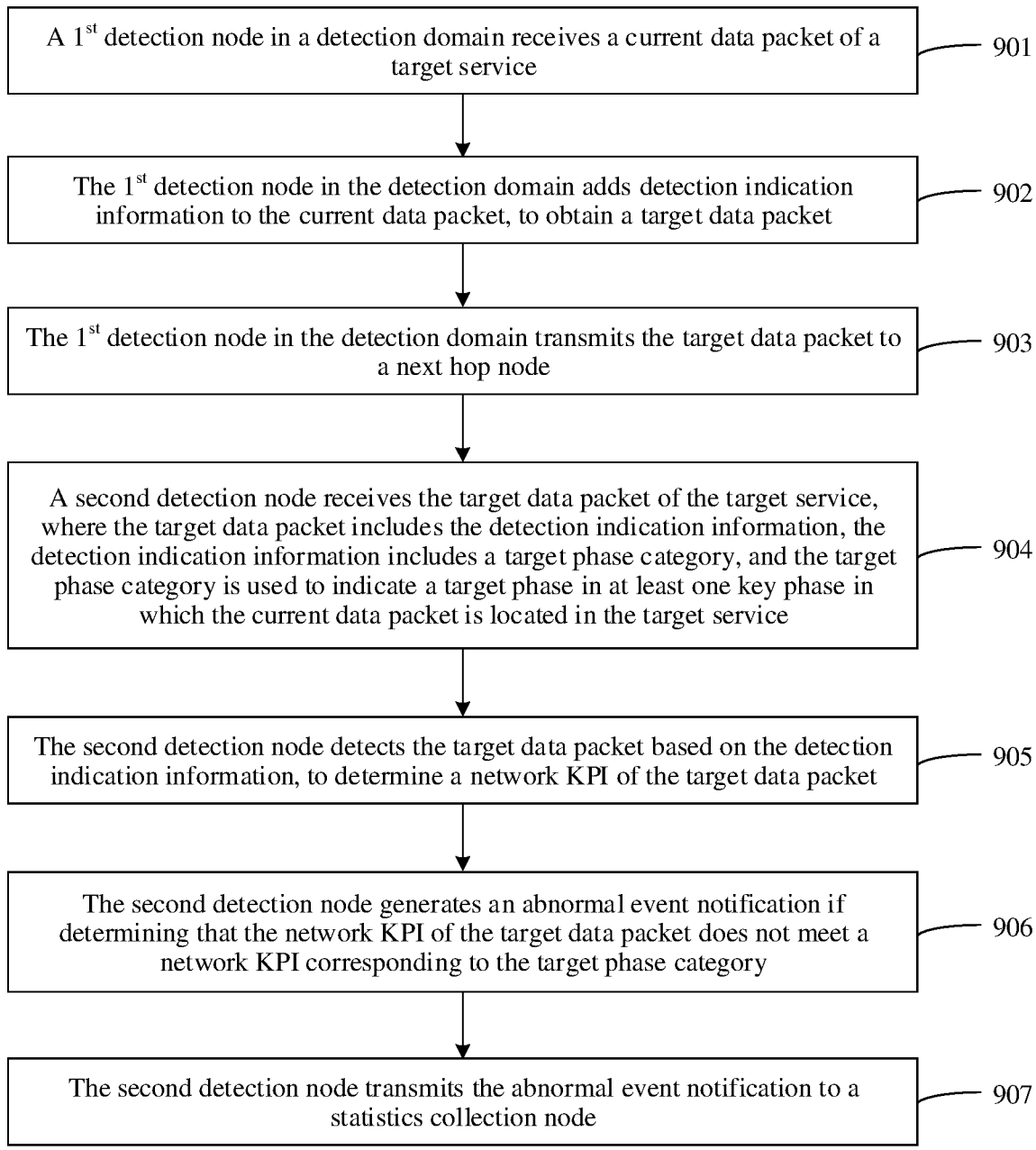
FIG. 9 is a schematic flowchart of a service monitoring method according to an example embodiment of this application.

In addition, to better understand this embodiment of this application, as shown in FIG. 9, the following procedure is further provided.

Step 901. A first detection node receives a current data packet of a target service.

Step 902. The first detection node adds detection indication information to the current data packet, to obtain a target data packet.

Step 903. The first detection node transmits the target data packet to a next hop node.

Step 904. A second detection node receives the target data packet of the target service.

Step 905. The second detection node detects the target data packet based on the detection indication information, to determine a network KPI of the target data packet.

Step 906. The second detection node generates an abnormal event notification if determining that the network KPI of the target data packet does not meet a network KPI corresponding to the target phase category.

Step 907. The second detection node transmits the abnormal event notification to a statistics collection node.

For processing in the procedure shown in FIG. 9, refer to descriptions in the procedures shown in FIG. 5 and FIG. 6.

In this way, a detection node in a detection domain can discover, in time, that the network KPI may affect QoE, and notify the statistics collection node, so that operation and maintenance personnel optimize a network in time.

Figure 10:
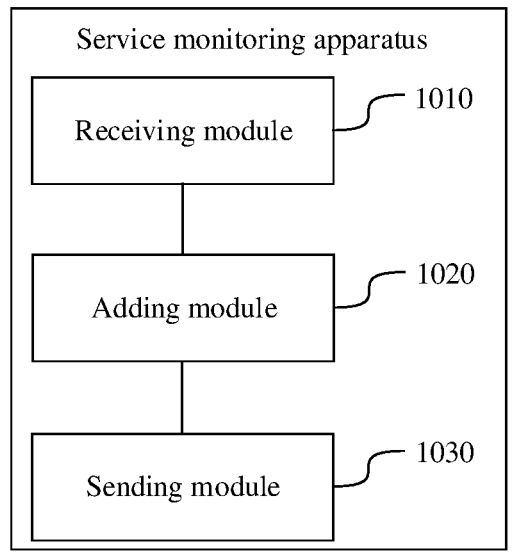
FIG. 10 is a schematic diagram of a structure of a service monitoring apparatus according to an example embodiment of this application.

FIG. 10 is a diagram of a structure of a service monitoring apparatus according to an embodiment of this application. The apparatus may be implemented as a part of the apparatus or the entire apparatus by using software, hardware, or a combination thereof. The apparatus provided in this embodiment of this application may implement the procedures in FIG. 5 and FIG. 9 in embodiments of this application. The apparatus includes a receiving module 1010, an adding module 1020, and a sending module 1030.

The receiving module 1010 is configured to receive a current data packet of a target service, and may be specifically configured to implement a receiving function in step 501 and an implicit step included in step 501.

The adding module 1020 is configured to add detection indication information to the current data packet, to obtain a target data packet, where the detection indication information includes a target phase category corresponding to the current data packet, the target phase category is used to indicate a target phase in at least one key phase in which the current data packet is located in the target service, and the detection indication information is used to indicate to detect the current data packet; and may be specifically configured to implement an adding function in step 502 and an implicit step included in step 502.

The sending module 1030 is configured to transmit the target data packet to a next hop node, and may be specifically configured to implement a sending function in step 503 and an implicit step included in step 503.

In a possible implementation, the receiving module 1010 is further configured to obtain a network KPI corresponding to the target phase category.

The adding module 1020 is further configured to set, in the detection indication information, the network KPI corresponding to the target phase category, where the network KPI corresponding to the target phase category is a network KPI that corresponds to the target phase of the target service when a QoE indicator meets a target ideal condition.

In a possible implementation, the receiving module 1010 is further configured to: obtain a network KPI corresponding to at least one phase category of the target service, where the at least one phase category is used to indicate the at least one key phase of the target service, the at least one phase category includes the target phase category, the network KPI corresponding to the at least one phase category is determined based on historical service data, a service type, and a key parameter of the target service, and the key parameter includes one or more of the target ideal condition of the QoE indicator, a parameter of a data packet transmit end and a parameter of a data packet receive end, or location information of a data packet receive end.

The adding module 1020 is further configured to add the network KPI corresponding to the at least one phase category to a forwarding table.

The adding module 1020 is further configured to: determine, from the forwarding table, the network KPI corresponding to the target phase category.

In a possible implementation, the adding module 1020 is further configured to: obtain, from the current data packet, the network KPI corresponding to the target phase category.

In a possible implementation, the adding module 1020 is further configured to: obtain, from the current data packet, the target phase category corresponding to the current data packet; or determine, based on a feature of the current data packet, the target phase category corresponding to the current data packet.

In a possible implementation, the target service is a live video service, and the key phase is any one of a head-end collection phase, an initial buffering phase, a scenario switching phase, or a head rotation rendering phase.

In a possible implementation, a network KPI corresponding to a category of the head-end collection phase and a network KPI corresponding to a category of the initial buffering phase include bandwidth; a network KPI corresponding to a category of the scenario switching phase includes maximum bandwidth, average bandwidth, and packet loss information of a key internal image; and a network KPI corresponding to a category of the head rotation rendering phase includes delay information.

Figure 11:
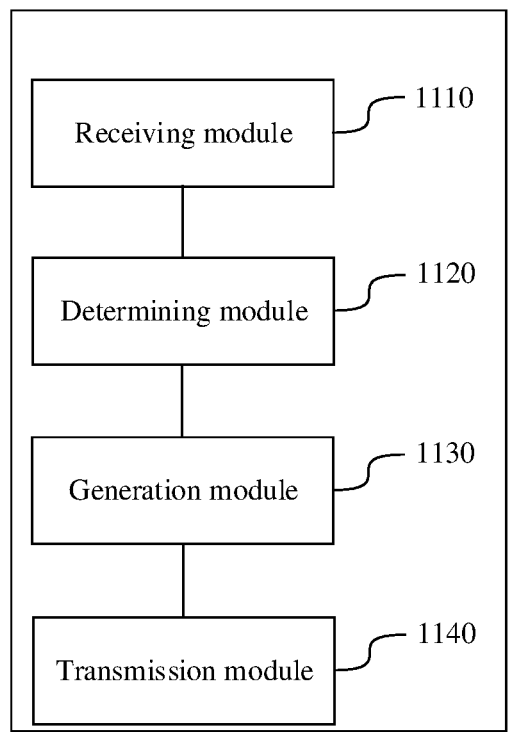
FIG. 11 is a schematic diagram of a structure of a service monitoring apparatus according to an example embodiment of this application.

FIG. 11 is a diagram of a structure of a service monitoring apparatus according to an embodiment of this application. The apparatus may be implemented as a part of the apparatus or the entire apparatus by using software, hardware, or a combination thereof. The apparatus provided in this embodiment of this application may implement the procedures in FIG. 6 and FIG. 9 in embodiments of this application. The apparatus includes a receiving module 1110, a detection module 1120, a generation module 113o, and a transmission module 1140.

The receiving module 1110 is configured to receive a target data packet of a target service, where the target data packet includes detection indication information, the detection indication information includes a target phase category, and the target phase category is used to indicate a target phase in at least one key phase in which a current data packet is located in the target service; and may be specifically configured to implement a receiving function in step 601 and an implicit step included in step 601.

The detection module 1120 is configured to detect the target data packet based on the detection indication information, to determine a network KPI of the target data packet; and may be specifically configured to implement a detection function in step 602 and an implicit step included in step 602.

The generation module 1130 is configured to generate an abnormal event notification if determining that the network KPI of the target data packet does not meet a network KPI corresponding to the target phase category, where the network KPI corresponding to the target phase category is a network KPI that corresponds to the target phase of the target service when a QoE indicator meets a target ideal condition; and may be specifically configured to implement a generation function in step 603 and an implicit step included in step 603.

The transmission module 1140 is configured to transmit the abnormal event notification to a statistics collection node, and may be specifically configured to implement a transmission function in step 604 and an implicit step included in step 604.

In a possible implementation, the receiving module 1110 is further configured to: obtain, from the detection indication information, the network KPI corresponding to the target phase category.

In a possible implementation, the receiving module 1110 is further configured to: receive a network KPI corresponding to at least one phase category of the target service, where the at least one phase category is respectively used to indicate the at least one key phase of the target service, the at least one phase category includes the target phase category, the network KPI corresponding to the at least one phase category is determined based on historical service data, a service type, and a key parameter of the target service, and the key parameter includes one or more of the target ideal condition of the QoE indicator, a parameter of a data packet transmit end and a parameter of a data packet receive end, or location information of a data packet receive end; add the network KPI corresponding to the at least one phase category to a forwarding table; and determine, from the forwarding table, the network KPI corresponding to the target phase category.

Figure 12:
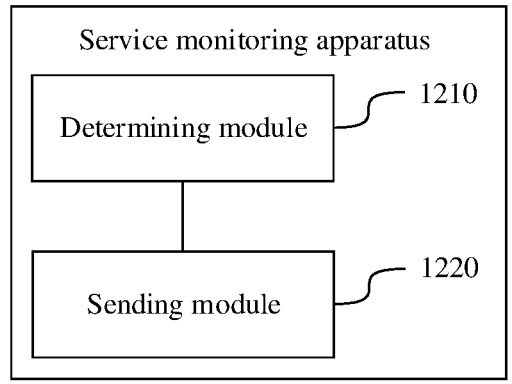
FIG. 12 is a schematic diagram of a structure of a service monitoring apparatus according to an example embodiment of this application.

FIG. 12 is a diagram of a structure of a service monitoring apparatus according to an embodiment of this application. The apparatus may be implemented as a part of the apparatus or the entire apparatus by using software, hardware, or a combination thereof. The apparatus provided in this embodiment of this application may implement the procedure of determining a network KPI corresponding to a key phase category in embodiments of this application. The apparatus includes a determining module 1210 and a sending module 1220.

The determining module 1210 is configured to determine, based on historical service data, a service type, and a key parameter of a target service, a network KPI corresponding to at least one phase category of the target service, where the key parameter includes one or more of a target ideal condition of a QoE indicator, a parameter of a data packet transmit end and a parameter of a data packet receive end, or location information of a data packet receive end, the at least one phase category is used to indicate at least one key phase of the target service, and for any phase category, a network KPI corresponding to the phase category is a network KPI that corresponds to a key phase of the phase category when the QoE indicator meets the target ideal condition.

The sending module 1220 is configured to send the network KPI corresponding to the at least one phase category.

In a possible implementation, the target service is a live video service, the parameter of the data packet transmit end and the parameter of the data packet receive end include a KQI of image quality, and the key parameter further includes a video transmission mode and a video encoding/decoding standard.

In a possible implementation, the sending module 1220 is configured to: send the network KPI corresponding to the at least one phase category to a $1^{st}$ detection node in a detection domain; or send the network KPI corresponding to the at least one phase category to each detection node in a detection domain, where the detection domain is a network domain in which the target service is detected.

Figure 13:
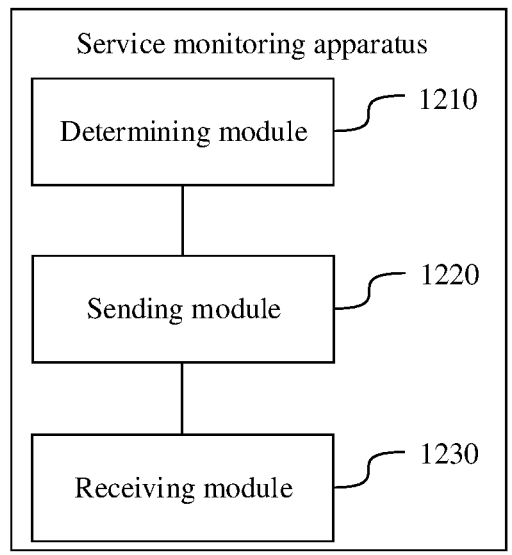
FIG. 13 is a schematic diagram of a structure of a service monitoring apparatus according to an example embodiment of this application.

In a possible implementation, as shown in FIG. 13, the apparatus further includes a receiving module 1230, configured to: receive an abnormal event notification sent by a detection node, where the abnormal event notification is used to indicate that a network KPI of a current data packet of the target service does not meet a network KPI corresponding to a target phase category, and the target phase category is used to indicate a target phase in the at least one key phase in which the current data packet is located in the target service.

Division into the modules in embodiments of this application is an example, and is merely logical function division and may alternatively be other division in actual implementation. In addition, functional modules in embodiments of this application may be integrated into a processor, or each of the modules may exist alone physically, or two or more modules are integrated into a module. The integrated module may be implemented in a form of hardware, or may be implemented in a form of a software functional module.

All or some of the foregoing embodiments may be implemented by using software, hardware, firmware, or any combination thereof. When software is used for implementation, all or some of embodiments may be implemented in a form of a computer program product. The computer program product includes one or more computer instructions. When the computer program instructions are loaded and executed on a server or a terminal, all or some of the procedures or functions according to embodiments of this application are generated. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, and microwave) manner. The computer-readable storage medium may be any usable medium accessible by a server or a terminal, or a data storage device, for example, a server or a data center, integrating one or more usable media. The usable medium may be a magnetic medium (for example, a floppy disk, a hard disk, and a magnetic tape), an optical medium (for example, a digital video disk (DVD)), or a semiconductor medium (for example, a solid-state drive).

What is claimed is:

1. An apparatus, comprising:
   a receiver, configured to receive a current data packet of a target service;
   at least one processor;
   a non-transitory computer readable storage medium storing a program that is executable by the at least one processor, the program including instructions to:
     add detection indication information to the current data packet, to obtain a target data packet, wherein the detection indication information comprises a target phase category corresponding to the current data packet, the target phase category indicates a target phase in at least one key phase in which the current data packet is located in the target service, and wherein the apparatus is a first detection node and the detection indication information indicates, to a second detection node, to detect the current data packet; and
   a transmitter, configured to transmit the target data packet to a next hop node;
   wherein the receiver is further configured to obtain a network key performance indicator (KPI) corresponding to the target phase category; and wherein the program further includes instructions to:
set, in the detection indication information, the network KPI corresponding to the target phase category, wherein the network KPI corresponds to the target phase when a quality of experience (QoE) indicator meets a target condition, and wherein the target phase category is determined based on the QoE indicator meeting the target condition.

2. The apparatus according to claim 1, wherein the receiver is further configured to:
obtain a network KPI corresponding to at least one phase category of the target service, wherein the at least one phase category indicates the at least one key phase of the target service, the at least one phase category comprises the target phase category, the network KPI corresponding to the at least one phase category is determined based on historical service data, a service type, and a key parameter of the target service, and the key parameter of the target service comprises one or more of the target condition of the QoE indicator, a parameter of a data packet transmit end and a parameter of a data packet receive end, or location information of the data packet receive end; and
wherein the program further includes instructions to:
add the network KPI corresponding to the at least one phase category to a forwarding table; and
determine, from the forwarding table, the network KPI corresponding to the target phase category.

3. The apparatus according to claim 1, wherein the program further includes instructions to:
obtain, from the current data packet, the network key performance indicator (KPI) corresponding to the target phase category.

4. The apparatus according to claim 1, wherein the program further includes instructions to:
obtain, from the current data packet, the target phase category corresponding to the current data packet.

5. The apparatus according to claim 1, wherein the program further includes instructions to:
determine, based on a feature of the current data packet, the target phase category corresponding to the current data packet.

6. The apparatus according to claim 1, wherein the program further includes instructions to:
determine that the network KPI does not meet a preset threshold corresponding to the target phase; and
generate an abnormal event notification based on determining that the network KPI does not meet the preset threshold, wherein the abnormal event notification comprises the target phase category;
wherein the transmitter is further configured to send the abnormal event notification to a network management device.

7. An apparatus, comprising:
a receiver, configured to receive a target data packet of a target service, wherein the target data packet comprises detection indication information added by a first detection node, the detection indication information comprises a target phase category, and the target phase category indicates a target phase in at least one key phase in which a current data packet is located in the target service, wherein the detection indication information indicates, to the apparatus, to detect the target data packet;
at least one processor;
a non-transitory computer readable storage medium storing a program that is executable by the at least one processor, the program including instructions to:
detect the target data packet based on the detection indication information, to determine a network key performance indicator (KPI) of the target data packet; and
generate an abnormal event notification in response to determining that the network KPI of the target data packet does not meet a network KPI corresponding to the target phase category, wherein the network KPI corresponding to the target phase category corresponds to the target phase of the target service when a quality of experience (QoE) indicator meets a target condition; and
a transmitter, configured to transmit the abnormal event notification to a statistics collection node;
wherein the receiver is further configured to:
obtain, from the detection indication information, the network KPI corresponding to the target phase category.

8. The apparatus according to claim 7, wherein the receiver is further configured to:
receive a network KPI corresponding to at least one phase category of the target service, wherein the at least one phase category indicates the at least one key phase of the target service, the at least one phase category comprises the target phase category, the network KPI corresponding to the at least one phase category is determined based on historical service data, a service type, and a key parameter of the target service, and the key parameter comprises one or more of the target condition of the QoE indicator, a parameter of a data packet transmit end and a parameter of a data packet receive end, or location information of the data packet receive end;
add the network KPI corresponding to the at least one phase category to a forwarding table; and
determine, from the forwarding table, the network KPI corresponding to the target phase category.

9. The apparatus according to claim 7, wherein the program further includes instructions to:
determine that the network KPI of the target data packet does not meet the network KPI corresponding to the target phase category for a preset number of times; and
generate the abnormal event notification in response to determining that the network KPI of the target data packet does not meet the network KPI corresponding to the target phase category for the preset number of times.

10. A system, comprising:
a first detection node;
a second detection node; and
a statistics collection node;
wherein the first detection node comprises:
at least one processor; and
a non-transitory computer readable storage medium storing a program that is executable by the at least one processor, the program including instructions to:
receive a current data packet of a target service;
add detection indication information to the current data packet, to obtain a target data packet, wherein the detection indication information comprises a target phase category corresponding to the current data packet, the target phase category indicates a target phase in at least one key phase in which the current data packet is located in the target service, and the detection indication information indicates, to the second detection node, to detect the current data packet;

obtain a network key performance indicator (KPI) corresponding to the target phase category; and set, in the detection indication information, the network KPI corresponding to the target phase category, wherein the network KPI corresponds to the target phase when a quality of experience (QoE) indicator meets a target condition, and wherein the target phase category is determined based on the QoE indicator meeting the target condition; and transmit the target data packet to the second detection node.

11. The system according to claim 10, wherein the program of the first detection node further includes instructions to:

obtain a network KPI corresponding to at least one phase category of the target service, wherein the at least one phase category indicates the at least one key phase of the target service, the at least one phase category comprises the target phase category, the network KPI corresponding to the at least one phase category is determined based on historical service data, a service type, and a key parameter of the target service, and the key parameter comprises one or more of the target condition of the QoE indicator, a parameter of a data packet transmit end and a parameter of a data packet receive end, or location information of the data packet receive end;

add the network KPI corresponding to the at least one phase category to a forwarding table; and determine, from the forwarding table, the network KPI corresponding to the target phase category.

12. The system according to claim 10, wherein the program of the first detection node further includes instructions to:

obtain, from the current data packet, the network KPI corresponding to the target phase category.

13. The system according to claim 10, wherein the program of the first detection node further includes instructions to:

obtain, from the current data packet, the target phase category corresponding to the current data packet.

14. The system according to claim 10, wherein the program of the first detection node further includes instructions to:

determine, based on a feature of the current data packet, the target phase category corresponding to the current data packet.

15. The system according to claim 10, wherein the second detection node comprises:

at least one processor;

a non-transitory computer readable storage medium storing a program that is executable by the at least one processor, the program including instructions to:

receive the target data packet of the target service;

detect the target data packet based on the detection indication information, to determine a network key performance indicator (KPI) of the target data packet;

generate an abnormal event notification in response to determining that the network KPI of the target data packet does not meet the network KPI corresponding to the target phase category, wherein the network KPI corresponding to the target phase category corresponds to the target phase of the target service when the QoE indicator meets the target condition; and transmit the abnormal event notification to the statistics collection node.

16. The system according to claim 10, wherein the statistics collection node comprises:

at least one processor; and a non-transitory computer readable storage medium storing a program that is executable by the at least one processor, the program including instructions to:

determine, based on historical service data, a service type, and a key parameter of the target service, a network key performance indicator (KPI) corresponding to at least one phase category of the target service, wherein the key parameter comprises one or more of the target condition of the QoE indicator, a parameter of a data packet transmit end and a parameter of a data packet receive end, or location information of the data packet receive end; and send the network KPI corresponding to the at least one phase category.

17. The system according to claim 16, wherein the target service is a live video service, the parameter of the data packet transmit end and the parameter of the data packet receive end comprise a key quality indicator (KQI) of image quality, and the key parameter further comprises a video transmission mode and a video encoding/decoding standard.

18. The system according to claim 16, wherein the program of the statistics collection node further includes instructions to:

send a network key performance indicator (KPI) corresponding to the at least one phase category to the first detection node; or send the network KPI corresponding to the at least one phase category to each detection node in a detection domain, wherein the detection domain is a network domain in which the target service is detected.

19. The system according to claim 16, wherein the program of the statistics collection node further includes instructions to:

receive an abnormal event notification sent by the second detection node, wherein the abnormal event notification indicates that a network key performance indicator (KPI) of the current data packet of the target service does not meet the network KPI corresponding to the target phase category.

20. The system according to claim 10, wherein the detection indication information further comprises a detection flag indicating whether to detect the current data packet, and wherein the program of the first detection node further includes instructions to:

set the detection flag in the detection indication information based on a preset sampling interval, wherein the detection flag is set to indicate to detect the current data packet when the current data packet meets the preset sampling interval.

* * * * *